(12) United States Patent  
Ramadoss et al.

(10) Patent No.: US 9,779,694 B2
(45) Date of Patent: *Oct. 3, 2017

(54) ADAPTIVE FRAME RATE CONTROL FOR A GRAPHICS SUBSYSTEM

(71) Applicant: Intel Corporation, Santa Clara, CA (US)

(72) Inventors: Murali Ramadoss, Folsom, CA (US); Eric C. Samson, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/706,410

(22) Filed: May 7, 2015

(65) Prior Publication Data

US 2015/0235626 A1    Aug. 20, 2015

Related U.S. Application Data

(63) Continuation of application No. 13/997,206, filed as application No. PCT/US2011/062501 on Nov. 30, 2011.

(51) Int. Cl.
    G09G 5/18    (2006.01)
    G06T 1/20    (2006.01)
    G06T 1/60    (2006.01)

(52) U.S. Cl.
    CPC ............. G09G 5/18 (2013.01); G06T 1/20 (2013.01); G06T 1/60 (2013.01)

(58) Field of Classification Search
    CPC .... G09G 2340/0435; G09G 5/18; G06T 1/20; G06T 1/60
    See application file for complete search history.

(56) References Cited

U.S. PATENT DOCUMENTS

| 2003/0093595 | A1 | 5/2003 | Smith et al. |
| 2005/0223249 | A1* | 10/2005 | Samson ............... G06F 1/3228 713/320 |
| 2005/0237327 | A1 | 10/2005 | Rubinstein et al. |
| 2006/0156061 | A1 | 7/2006 | Niino |
| 2008/0056373 | A1* | 3/2008 | Newlin ................. H04N 19/91 375/240.23 |
| 2008/0074415 | A1 | 3/2008 | Woo et al. |
| 2008/0211822 | A1 | 9/2008 | Kim |
| 2009/0172241 | A1 | 7/2009 | Chen |
| 2010/0107013 | A1 | 4/2010 | Mopur |
| 2010/0306737 | A1 | 12/2010 | Hamilton, II et al. |
| 2012/0044251 | A1* | 2/2012 | Mark .................... G06F 3/0485 345/474 |

(Continued)

OTHER PUBLICATIONS

Non-Final Office Action for U.S. Appl. No. 13/997,206, mailed May 8, 2015.

(Continued)

Primary Examiner — Xiao Wu
Assistant Examiner — Chong Wu
(74) Attorney, Agent, or Firm — Green, Howard & Mughal LLP

(57) ABSTRACT

Examples are disclosed for adjusting a performance state of a graphics subsystem and/or a processor based on a comparison of an average frame rate to a target frame rate and also based on whether the graphics subsystem is in a burst mode or sustained mode of operation.

13 Claims, 8 Drawing Sheets

(56) References Cited

U.S. PATENT DOCUMENTS

2012/0106669 A1    5/2012  Rao
2012/0139596 A1*   6/2012  He .................... H03L 7/0997
                                                          327/158

OTHER PUBLICATIONS

Final Office Action for U.S. Appl. No. 13/997,206, mailed Nov. 19, 2015.
International Search Report and Written Opinion received for PCT Patent Application No. PCT/US2011/062501, mailed Jun. 26, 2013, 10 pages.
International Preliminary Report on Patentability for PCT/US2011/062501.
Non-Final Office Action, mailed Aug. 24, 2016, for U.S. Appl. No. 13/997,206, 24 pages.
Final Office Action for U.S. Appl. No. 13/997,206 dated Apr. 20, 2017, 23 pages.

* cited by examiner

Program Code 300

```
Define enum MODE {
      BURST = 0;
      SUSTAINED = 1;
      }
Set MODE=BURST
Current fps = 0
CurrentTime = 0
PreviousTime = 0
ExpiredTime = 0;
Set ExpiredTime = ExpiredTime + (CurrentTime - PreviousTime)

If Mode = = BURST
{
      If (ExpiredTime > TimeLimit)
      {
         If (avg Rendering time >= Target Render time)
            Mode = SUSTAINED;

If (avgfps > Targetfps)
         {
            If (Current Graphics Subsystem P state > Graphics Subsystem Pn)
               Reduce to next lower Graphic Subsystem P state;
            else
               Reduce the Central Processor P state
          }
         Stay at the current Graphics Subsystem P state
      }
      else
         Still in the load screen, do nothing.
}

If Mode == SUSTAINED
{
      If (avgfps < Targetfps)
      {
         If (Current Graphics Subsystem P state ! = P0 state)
            Raise the Graphics Subsystem P state;
         else
             do nothing
         }
         else
            Reduce the Graphics Subsystem P state If (avg Rendering time < (Target Render time)
         {
            MODE = BURST
            ExpiredTime = 0;
         }
}
```

FIG. 3

ADAPTIVE FRAME RATE CONTROL FOR A GRAPHICS SUBSYSTEM

CLAIM FOR PRIORITY

This application is a continuation of U.S. patent application Ser. No. 13/997,206, filed on 22 Jun. 2013, titled "ADAPTIVE FRAME RATE CONTROL FOR A GRAPHICS SUBSYSTEM", which claims priority to PCT Patent Application Serial No. PCT/US2011/062501, filed on 30 Nov. 2011, titled "ADAPTIVE FRAME RATE CONTROL FOR A GRAPHICS SUBSYSTEM", and which are incorporated herein by reference in their entirety for all purposes.

BACKGROUND

Graphics subsystems that perform processing of images for computing platforms may consume large amounts of power. Mobile computing platforms operating under limited amounts of available power (e.g., battery power) typically attempt to ration or reduce power by placing various components of the computing system in different performance states. In some examples, the different performance states may be based on usage or performance models. These usage or performance models often may be an attempt to balance power saving with computing platform performance.

BRIEF DESCRIPTION OF THE DRAWINGS

FIG. 3 illustrates an example program code.

DETAILED DESCRIPTION

As contemplated in the present disclosure, usage or performance models may be an attempt to balance power saving with computing platform performance. In some examples, usage or performance models may not account for short burst of activity by the graphics subsystem. For example, graphics intensive applications may include loading game programs and the associated textures for displaying elements of these game programs. As the game programs load, status updates may be displayed on load screens to keep a user informed of the loading process. These load screens may execute at a frame rate of 100 to 500 frames per second (fps). Although the frame rates are relatively high, the small and bursty nature may result in a low power drain by a graphics subsystem. The low power drain may be the result of the load screens being rendered in a relatively short amount of time.

Current usage or performance models for graphics subsystems may throttle power usage based on frame rate thresholds irrespective of underlying workload or power usage. But, as mentioned above, examples such as game load screens may have short, high frame rate bursts, yet use low amounts of power. As a result, graphics subsystem power usage models based primarily on frame rate thresholds may compromise a game user's experience as graphics subsystems may be unnecessarily powered down.

In some examples, techniques are implemented for adaptive frame rate control for a graphics subsystem. For these examples, separate render times for one or more frames rendered by a graphics subsystem for a computing platform may be gathered. An average render time for the separate render times may be determined based, at least in part, on whether the separate render times have been gathered for at least a given time interval. In some examples, the interval could be the time taken to render the entire frame. A determination of whether the graphics subsystem is operating in either a burst mode or a sustained mode based on a comparison of the average render time to at least a portion of the target render time may be made. An average frame rate over the time interval may then be determined based on a determination of sustained (non-burst) mode operation for the graphics subsystem. A determination of whether to adjust a performance state associated with the graphics subsystem based on a comparison of the average frame rate to a target frame rate may then be made. For some examples, adjusting the performance state may include raising or lowering the performance state associated with the graphics subsystem in order to raise or lower a subsequent average frame rate.

Figure 1:
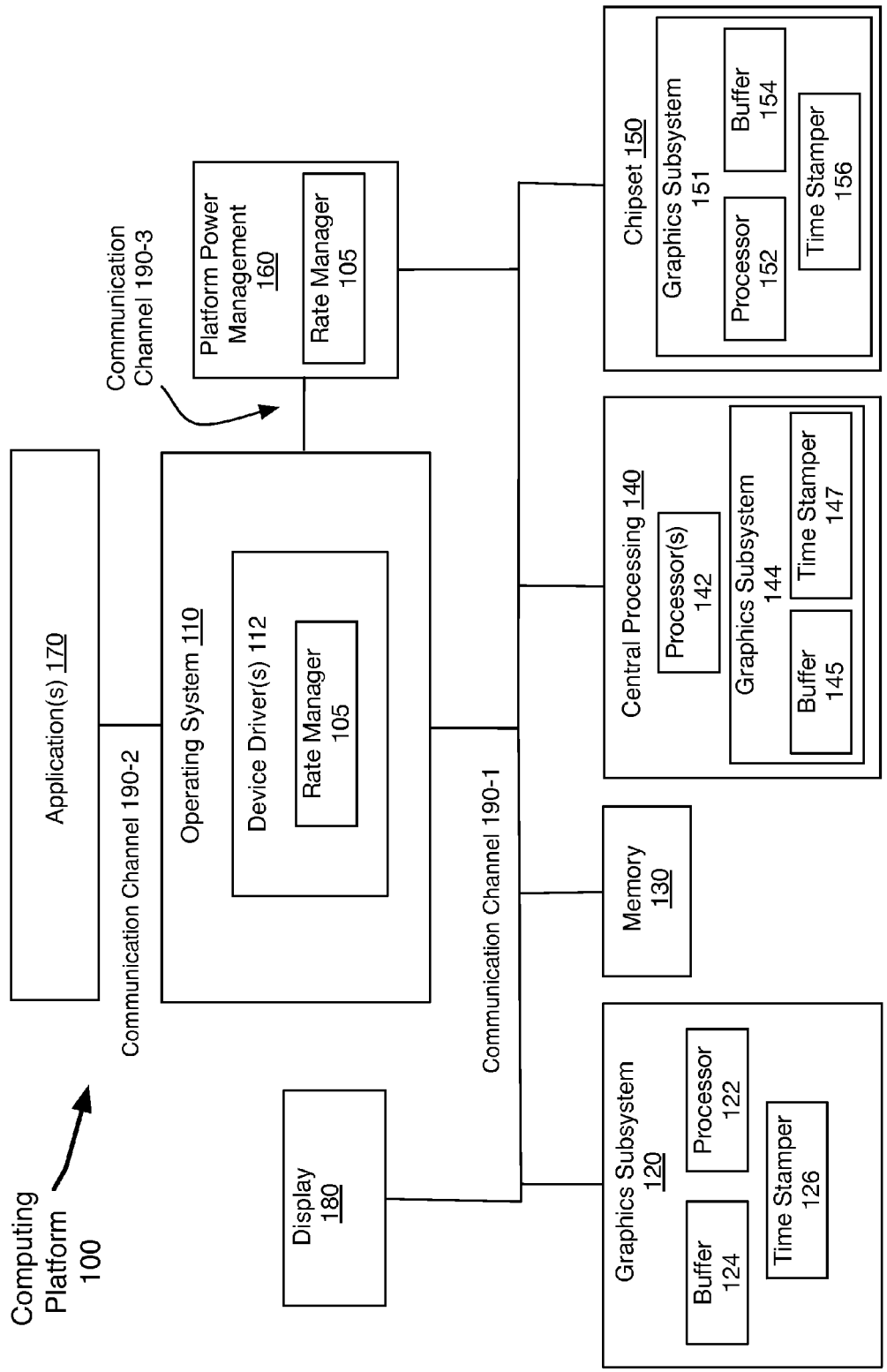
FIG. 1 illustrates an example computing platform.

FIG. 1 illustrates an example computing platform 100. As shown in FIG. 1, computing platform 100 includes an operating system 110, a graphics subsystem 120, a memory 130, central processing unit 140, a chipset 150, a platform power management 160, application(s) 170 and a display 180. In some examples, as shown in FIG. 1, communication channels 190-1 to 190-3 may communicatively couple or interconnect the various elements of computing platform 100. The present disclosure is not limited to only the elements shown in FIG. 1 for computing platform 100. The present disclosure also contemplates computing platforms including more elements (e.g., storage, radios, network interfaces, etc.) or fewer elements than those depicted in FIG. 1.

According to some examples, as shown in FIG. 1, operating system 110 includes device driver(s) 112. Also, as shown in FIG. 1, other graphics subsystems are depicted. For example, central processing unit 140 and chipset 150 are shown as including graphics subsystems 144 and 151, respectively. Device driver(s) 122 may include, but are not limited to, one or more device drivers to relay information between application(s) 170 and at least some of the elements of graphics subsystem 120, graphics subsystem 144 or graphics subsystem 151. These one or more device drivers of device driver(s) 122 may include a rate manager 105. A rate manager 105 may also be included as part of platform power management 160. For some examples, as described more below, a rate manager 105 included in device driver(s) 112 and/or platform power management 160 may include logic and/or features configured to adaptively control video or graphic frames rendered by the graphics subsystems mentioned above.

In some examples, processor 122 and buffer 124 of graphics subsystem 120 may be implemented as a graphic processing unit or a video processing unit for computing platform 100. For these examples, buffer 124 may represent one or more command or batch buffers. Buffer 124 may be used to at least temporarily store one or more render commands to be executed by processor 122 for rendering frames to be displayed at display 180. Buffer 124 may include, but is not limited to, random access memory (RAM), dynamic random access memory (DRAM), static RAM (SRAM) or graphic DRAM (GDRAM). Also, for these examples, time stamper 122 may be configured to time stamp separate render times for each render command that enters (temporarily stored) and exits (executed by processor 122) buffer 124. Time stamping by time stamper 122 may also include forwarding render time information to rate manager 105.

According to some examples, central processing unit 140 may be implemented as a central processing unit for computing platform 100. In some examples, processor(s) 142 may work in cooperation with graphics subsystem 120 to execute or render commands for video or graphic frames to be displayed at display 180. For these examples, graphics subsystem 144 may be disabled. In other examples, should graphics subsystem 120 be inactive or removed from computing platform 100, processor(s) 142 may work in cooperation with graphics subsystem 144 to execute or render commands for video or graphic frames to be displayed at display 180. Similar to buffer 124 mentioned above, buffer 145 may represent one or more command buffers. Buffer 145 may at least temporarily store one or more render commands to be executed by processor(s) 142 for rendering frames to be displayed at display 180. Buffer 145 may also include, but is not limited to, RAM, DRAM, SRAM or GDRAM. Also, a time stamper 147 may be configured to forward render time information to rate manager 105.

In some examples, chipset 150 may provide intercommunication among operating system 110, graphics subsystem 120, memory 130, central processing unit 140, chipset 150, platform power management 160 and/or application(s) 170. Chipset 150 may also provide intercommunication (e.g., via communication channel 190-1) among other possible elements of computing platform 100 such as storage (not shown).

According to some examples, elements of chipset 150 may work in cooperation with graphics subsystem 120 to execute or render commands for video or graphic frames to be displayed at display 180. For these examples, graphics subsystem 151 may be disabled. In other examples, should graphics subsystem 120 be inactive or removed from computing platform 100, elements of graphics subsystem 151 (e.g., a processor 152) may execute or render commands for video or graphic frames to be displayed at display 180. Similar to buffers 124 and 145 mentioned above, buffer 156 may represent one or more command buffers. Buffer 156 may at least temporarily store one or more render commands. For these other examples, buffer 156 may also include, but is not limited to, RAM, DRAM, SRAM or GDRAM. Also, a time stamper 156 may be configured to forward render time information to rate manager 105.

In some examples, application(s) 170 may include a game program relaying commands via device driver(s) 112 to processor 122 in graphics subsystem 120 or to elements of graphics subsystems 144 or 151. For examples having commands relayed to graphics subsystem 120, buffer 124 may be used to at least temporarily store one or more render commands to be executed by processor 122. Rate manager 105 (e.g., located at or with device driver(s) 122 or platform power management 160) may include logic and/or features to gather the separate render times based on the separately time stamped render commands that may have been time stamped by time stamper 126.

According to some examples, rate manager 105 may include logic and/or features to gather the render times for at least a given time interval (e.g., 2 seconds). The given time interval, for example, may be a length of time to allow the render times to be gathered such that momentary spikes do not distort a determination of an average render time. Subsequent to expiration of the given time interval, rate manager 105 may include logic and/or features to average the separate render times and compare the average to a target render time.

In some examples, a target render time may be a relatively short render time (e.g., less than 4 milliseconds (ms)). The relatively short render times may set a threshold for determining whether commands being executed by processor 122 are part of a burst mode or a sustained mode of operation for graphics subsystem 120. If the average render times, for example, are less than the target render time, rate manager 105 may determine that graphics subsystem 120 is in a burst mode of operation (e.g., short, but high fps load screen operation). As described more below, rate manager 105 may include logic and/or features to adjust a power or performance state associated with graphics subsystem 120. The adjustment of the power/performance states may include either raising or lowering the performance state in order to cause a change in a subsequent average frame rate for graphics subsystem 120. These performance state adjustments may include changing processor and/or device power or operating performance states.

According to some examples, memory 130 may be implemented as a volatile memory device utilized by various elements of computing platform 100 (e.g., as off-chip memory). For these implementations, memory 130 may include, but is not limited to, RAM, DRAM or SRAM.

According to some examples, platform power management 160 may be implemented as logic and/or features configured to either independently manage power or cooperate with operating system 110 to manage power for computing platform 100. In other examples, although not shown in FIG. 1, platform power management 160 may be included as a software module operating within operating system 110. In yet another example, platform power management 160 may be included with elements of chipset 150. For any of these three examples, a rate manager 105 may be located with or at platform power management 160 in order to facilitate adaptive frame rate control for any of the above-mentioned graphics subsystem implementations.

According to some examples, communication channels 190-1 to 190-3 may operate in accordance with one or more protocols or standards that enable elements of computing platform 100 to communicatively couple. These protocols or standards may be described in one or one or more industry standards (including progenies and variants) such as those associated with the Inter-Integrated Circuit ($I^2C$) specification, the System Management Bus (SMBus) specification, the Accelerated Graphics Port (AGP) specification, the Peripheral Component Interconnect Express (PCI Express) specification, the Universal Serial Bus (USB), specification or the Serial Advanced Technology Attachment (SATA) specification. Although this disclosure is not limited to only the above-mentioned standards and associated protocols.

In some examples, processor 122, processor(s) 142 or processor 152 may be include a processing unit having one or more processor cores or having any number of processors having any number of processor cores. Processor 122, processor(s) 142 or processor 152 may include any type of processing unit, such as, for example, a multi-processing unit, a reduced instruction set computer (RISC), a processor having a pipeline, a complex instruction set computer (CISC), digital signal processor (DSP), and so forth.

Figure 2:
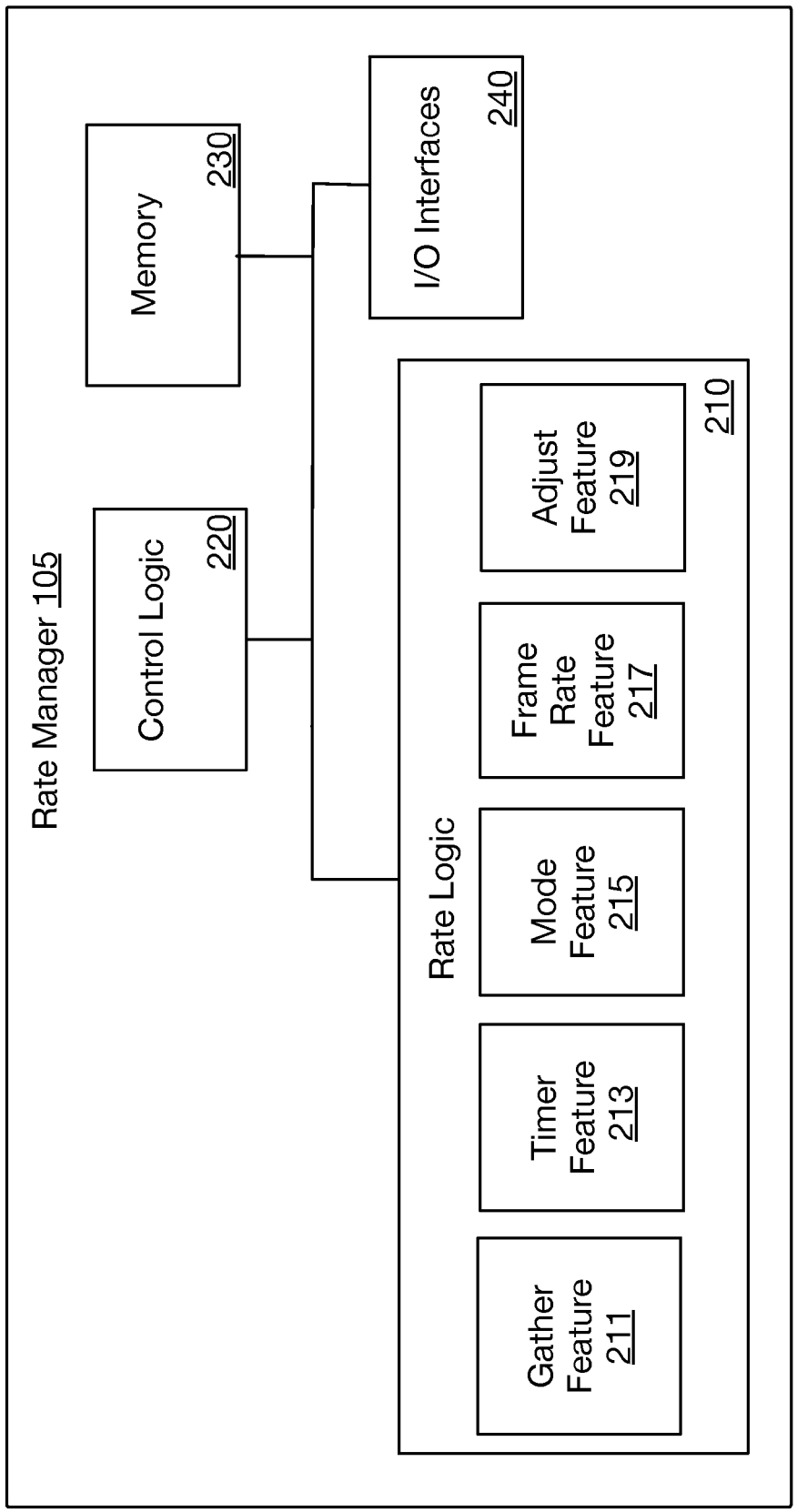
FIG. 2 illustrates a block diagram of an example architecture for a rate manager.

In some examples, computing platform 100 may be at least part of a mobile computing device. Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth FIG. 2 illustrates a block diagram of an example architecture for rate manager 105. As described above for computing platform 100 in FIG. 1, device driver(s) 122 or platform power management 160 may include rate manager 105. In some examples, rate manager 105 includes features and/or logic configured or arranged to provide adaptive frame rate control for a graphics subsystem.

The example rate manager 105 of FIG. 2 includes rate logic 210, control logic 220, a memory 230 and input/output (I/O) interfaces 240. As illustrated in FIG. 2, rate logic 210 may be coupled to control logic 220, memory 230 and I/O interfaces 240. Rate logic 210 may include one or more of a gather feature 211, a timer feature 213, a mode feature 215, a frame rate feature 217, or an adjust feature 219, or any reasonable combination thereof.

In some examples, the elements portrayed in FIG. 2 are configured to support or enable rate manager 105 as described in this disclosure. A given rate manager 105 may include some, all or more elements than those depicted in FIG. 2. For example, rate logic 210 and control logic 220 may separately or collectively represent a wide variety of logic device(s) or executable content to implement the features of rate manager 112. Example logic devices may include one or more of a microprocessor, a microcontroller, a process circuit, a field programmable gate array (FPGA), an application specific integrated circuit (ASIC), a sequestered thread or a core of a multi-core/multi-threaded microprocessor or a combination thereof.

In some examples, as shown in FIG. 2, rate logic 210 includes gather feature 211, timer feature 213, mode feature 215, frame rate feature 217, or adjust feature 219. Rate logic 210 may be configured to use one or more of these features to perform operations. For example, gather feature 211 may gather separate render times for one or more frames rendered by a graphics subsystem (e.g., graphics subsystem 120). Timer feature 215 may determine whether time interval has been reached during the gathering of render time. Mode feature 215 may determine an average render time for the gathered separate rendered times and then compare the average render time to a target time. Mode feature 215 may then determine of the graphics subsystem is in a burst or sustained mode of operation. If in a sustained mode of operation, for example, frame rate feature 217 may determine an average frame rate for the frames rendered by the graphics subsystem. Also, adjust feature 219 may compare the average frame rate to a target frame and may adjust a performance state associated with the graphics subsystem based on the comparison. The adjusted performance state, for example, may either raise or low subsequent frames rates for the graphics subsystem.

In some examples, control logic 220 may be configured to control the overall operation of rate manager 105. As mentioned above, control logic 220 may represent any of a wide variety of logic device(s) or executable content. For some examples, control logic 220 may be configured to operate in conjunction with executable content or instructions to implement the control of rate manager 105. In some alternate examples, the features and functionality of control logic 220 may be implemented within rate logic 210.

According to some examples, memory 230 may be arranged to store executable content or instructions for use by control logic 220 and/or rate logic 210. The executable content or instructions may be used to implement or activate features or elements of rate manager 105. As described more below, memory 230 may also be arranged to at least temporarily maintain information associated with determining averages for render times and frame rates and comparing the averages to target render times and frame rates in order to adjust performance states for a graphics subsystem.

Memory 230 may include a wide variety of memory media including, but not limited to, one or more of volatile memory, non-volatile memory, flash memory, programmable variables or states, RAM, ROM, or other static or dynamic storage media.

In some examples, I/O interfaces 240 may provide an interface via a local communication medium or link between rate manager 105 and elements of computing platform 100 depicted in FIG. 1. I/O interfaces 240 may include interfaces that operate according to various communication protocols to communicate over the local communication medium or link (e.g., $I^2C$, SMBus, AGP, PCI Express, USB, SATA, etc).

FIG. 3 illustrates an example program code 300. In some examples, rate manager 105 as shown in FIG. 1 or described in FIG. 2 may include logic and/or features to implement at least portions of program code 300. For these examples, program code 300 may be implemented in order to provide adaptive frame rate control for a graphics subsystem. Although this disclosure is not limited to implementing only program code 300 in order to provide adaptive frame rate control.

According to some examples, rate manager 105 may assume that an active graphics subsystem of computing platform 100 is operating in a burst mode. Thus, as shown in FIG. 3, program code 300 indicates an initial mode of BURST. As described more below, as part of implementing program code 300, logic and/or features of rate manager 105 may first gather render times for a given time interval (TimeLimit) and then determine average render times and average frame rates. Also, as described more below, logic and/or features of rate manager 105 may either reduce/lower or raise/higher power or performance states (P states) based on a comparison of average render times and average frame rates and whether the active graphics subsystem is found to be in a burst or sustained mode.

As mentioned above for FIG. 1, rate manager 105 may include logic and/or features to gather the render times for at least a given time interval (e.g., 2 seconds). The given time interval may allow the render times to be gathered such that momentary spikes do not distort a determination of an average render time. The given time interval may also apply to determining the average frame rate that is depicted in FIG. 3 as avefps. In some examples, rate manager 105 may implement the following example filter code to possibly filter out momentary spikes:

```
{
  TimeConstant = pick 2000 ms moving average
  α = dt/2000;
  avefps (n) = (1-α) avgfps(n-1) + α(fi)
  ave Render time (n) = (1-α) avg Render time(n-1) + α(Ri)
  return avefps, ave Render time;
}
```

Figure 4:
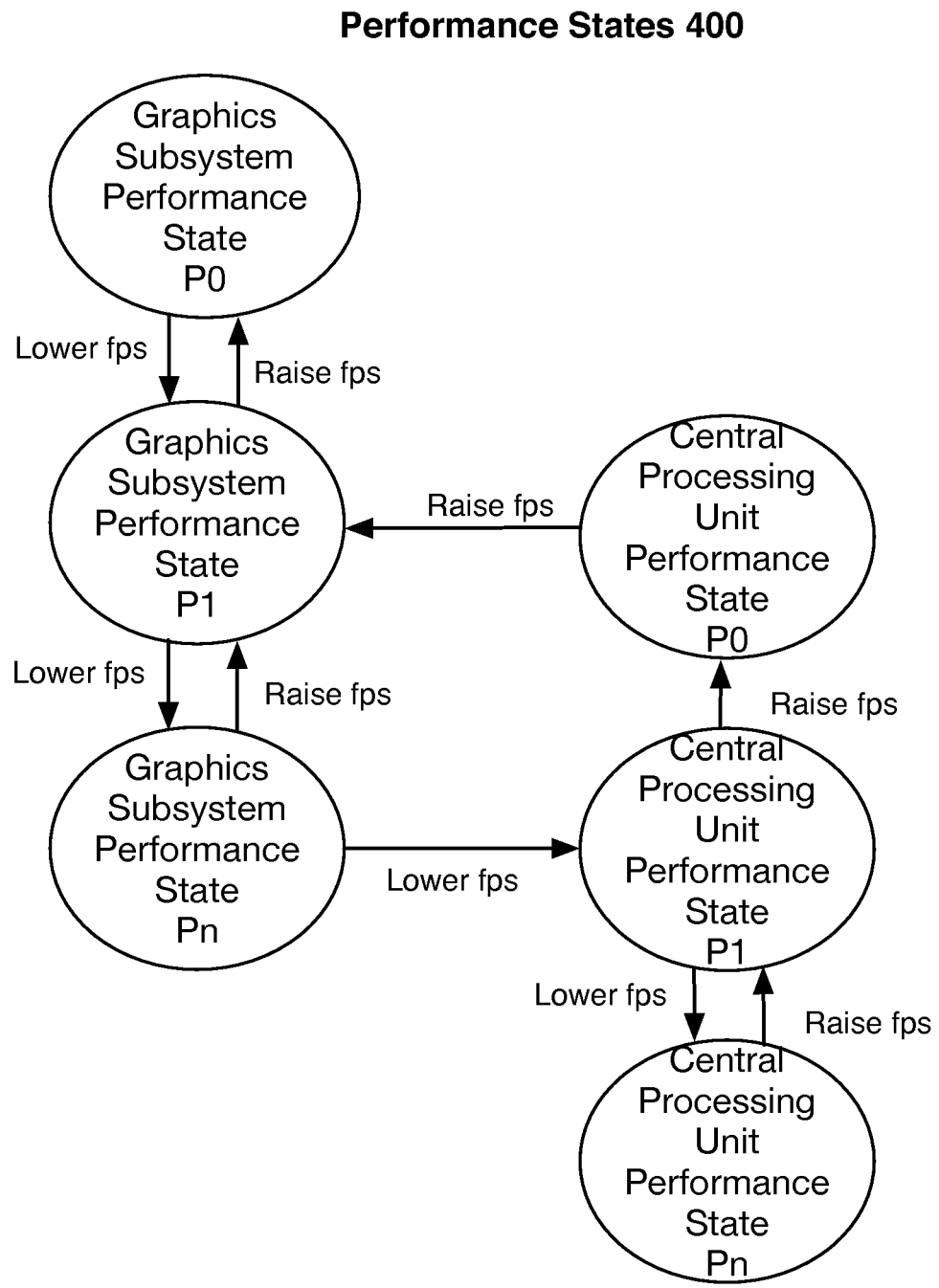
FIG. 4 illustrates a diagram of example performance states.

FIG. 4 illustrates a diagram of example performance states 400. In some examples, as shown in FIG. 4, three performance states P0, P1 and Pn are separately depicted for a graphics subsystem 120 and for a central processing unit 140. For these examples, the three performance states P0, P1 and Pn may be associated with device and processor performance states described in an industry standard such as the Advanced Configuration and Power Interface (ACPI) specification, including progeny and variants. Similar to ACPI, performance state P0 may indicate a maximum performance or power state that draws the highest amount of power for an active graphics subsystem or for an active central processing unit (e.g., processor(s) 142). P1 may indicate a less than maximum performance or power state that draws less than the highest amount of power. Pn may indicate a minimum performance or power state that draws the lowest amount of power in order to remain in an active state. It may be appreciated that embodiments are not limited to only these three performance or power states, and any number of performance or power states may be used for a given implementation. The embodiments are not limited in this context.

In some examples, as mentioned above and described more below, rate manager 105 may include logic and/or features to implement at least portions of program code 300 to either reduce/lower or raise/higher performance states (P states). As shown in FIG. 4, for example, adjusting the performance state associated with an active graphics subsystem 120 from a performance state of P0 to a performance state of P1 may lower the frame rate (fps). The lowering of the fps, for example, may be a result of less performance available to graphics subsystem 120 for rendering frames. Conversely, raising a performance state from either a performance state of Pn or P1 may increase the rate at which frames may be rendered.

According to some examples, graphics subsystem 120 may already be in the lowest active performance state of Pn. For these examples, rate manager 105 may include logic and/or features to cause the performance state associated with the central processing unit 140 to be reduced. The reduced performance state associated with the central processing unit 140 may indirectly slow down the rate at which application(s) 170 may provide commands to graphics subsystem 120. This indirect slow down may reduce the rate at which frames may be rendered.

Although not shown in FIG. 4, other techniques could be used to reduce/lower or raise/higher performance states. For these other techniques, rate manager 105 may include logic and/or features to cause graphics subsystem 120 and/or central processing unit 140 to operate at different duty cycles by forcing graphics subsystem 120 and/or central processing unit 140 to go into a sleep power state for varying amounts of time. For example, longer sleep times would reduce the frame rate and shorter sleep times may raise the frame rates.

Figure 5A:
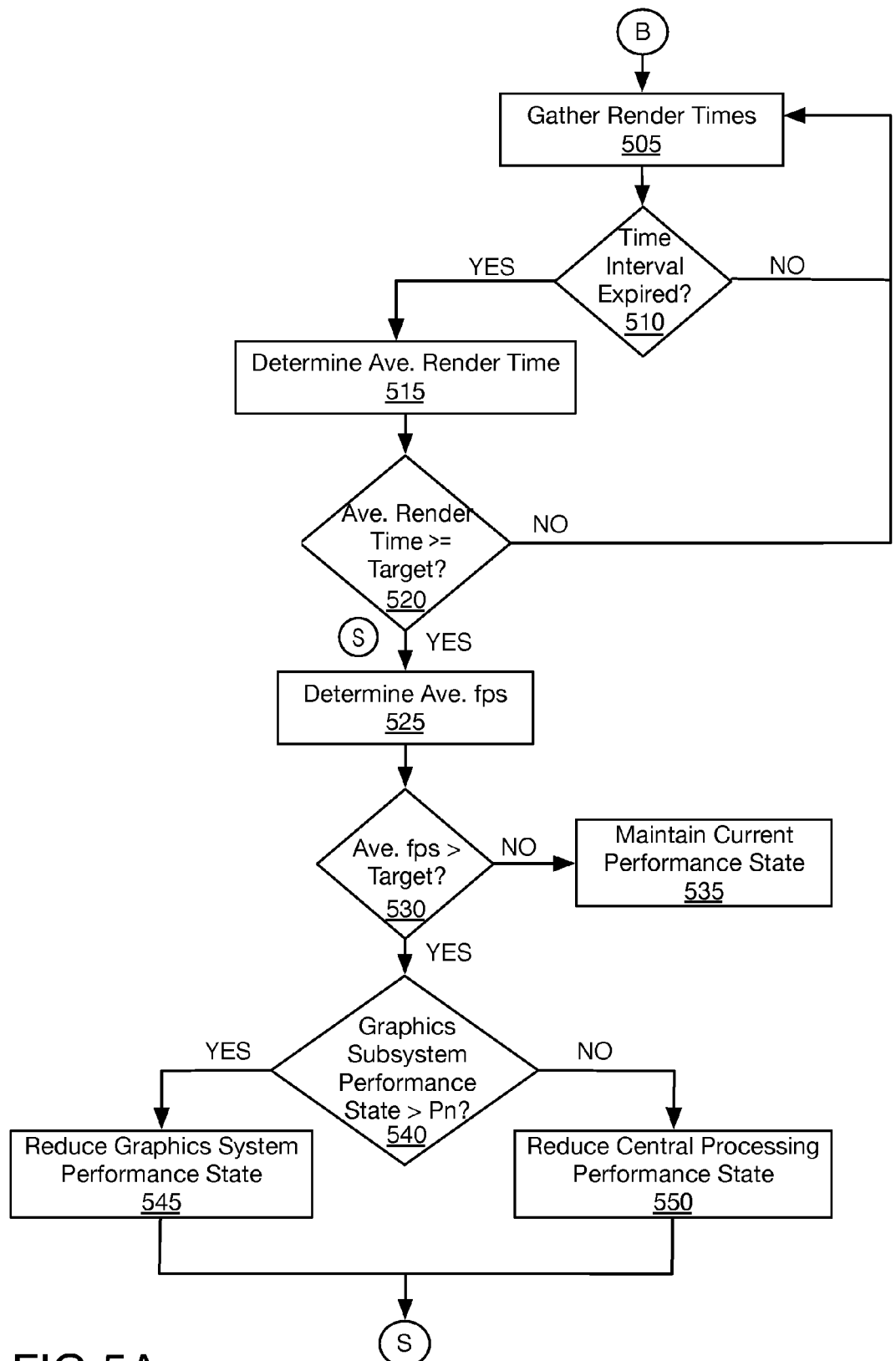
FIGS. 5A-5B illustrate flow charts of example operations for adaptive frame rate control.
Figure 5B:
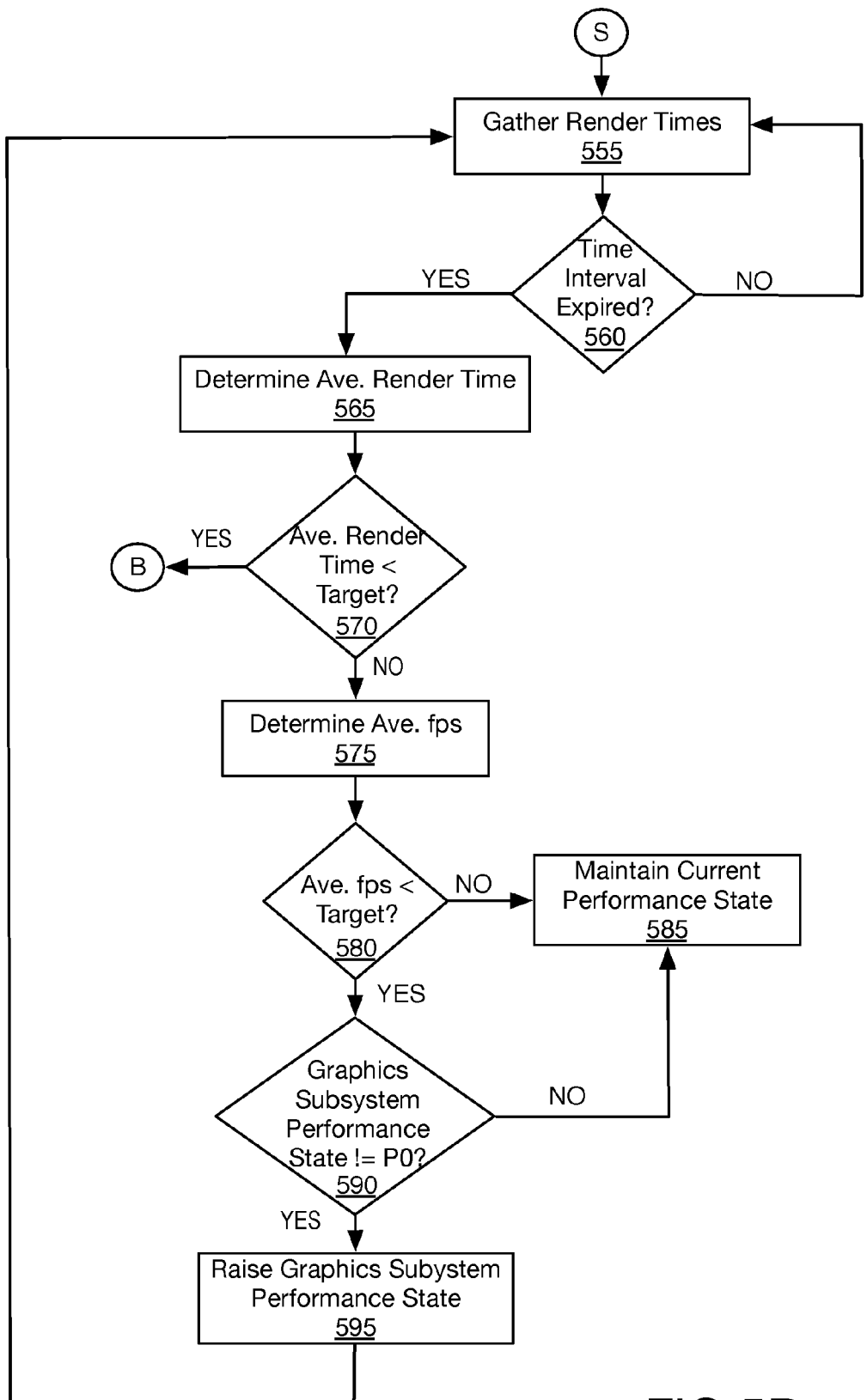

FIGS. 5A-5B illustrate flow charts of example operations for adaptive frame rate control. In some examples, elements of computing platform 100 as shown in FIG. 1 may be used to illustrate example operations related to the flow charts depicted in FIGS. 5A and 5B. Rate manager 105 as shown in FIG. 1 and FIG. 2 may also be used to illustrate the example operations. But the described operations are not limited to implementations on computing platform 100 or to rate manager 105. Also, logic and/or features of rate manager 105 may implement program code 300 as shown in FIG. 3. The example operations may also be implemented using other program codes or algorithms for adaptive frame rate control.

As shown in FIG. 5A, for some examples, a burst mode "B" of operation may be assumed as the starting point. Thus, moving from circle B to block 505 (Gather Render Times), rate manager 105 located with either device driver(s) 112 or platform power management 160 may include logic and/or features configured to gather first separate render times (e.g., via gather feature 211) for one or more frames rendered by an active graphics subsystem (e.g., graphics subsystem 120).

Proceeding from block 505 to decision block 510 (Time Interval Expired?), rate manager 105 may include logic and/or features configured to determine whether a first time limit or first time interval has been reached (e.g., via timer feature 213). In some examples, the determination may be made in order to account for render time anomalies (e.g., short render time spikes). If the first time interval has expired, the process moves to block 515. Otherwise, the process moves back to block 505.

Moving from decision block 510 to block 515 (Determine Ave. Render Time), rate manager 105 may include logic and/or features configured to determine a first average render time (e.g., via mode feature 215). In some examples, the first separate render times gathered over the first time interval and at least a portion of the above-mentioned example filter code may be used to determine the first average render time.

Proceeding from block 515 to decision block 520 (Ave. Render Time>=Target?), rate manager 105 may include logic and/or features configured to compare the first average render time to a target render time (e.g., via mode feature 215). In some examples, the target render time may be based on a render time that indicates a sustained mode of operation rather than a burst mode. For example, in a sustained mode, the processor for the active graphics subsystem (e.g., processor 122) may be executing a continual stream of commands in order to render frames. So the target render time may be set at or near render times observed when the processor executes the continual stream of commands. If the first average render time is greater than (or equal to) the target render time, then graphics subsystem 120 is deemed to be in a sustained mode and the process moves to block 525. Otherwise, graphics subsystem 120 is deemed to still be in a burst mode and the process moves back to block 505.

Proceeding from block 525 to decision block 530 (Ave. fps>Target?), rate manager 105 may include logic and/or features configured to compare the first average frame rate to a target frame rate (e.g., via frame rate feature 217). In some examples, the target frame rate may be based on a usage model that may have target frame rates that maintain an acceptable user experience when viewing rendered frames (e.g., on display 180). For example, a frame rate of at least 30 fps may be acceptable in some usage models, while in other usage models a higher frame rate of at least 60 fps may be acceptable. If the first average fps is not greater than the target fps, the process moves to block 535. Otherwise, the process moves to decision block 540.

Proceeding from block 525 to decision block 530 (Ave. fps>Target?), rate manager 105 may include logic and/or features configured to compare the first average frame rate to a target frame rate (e.g., via frame rate feature 217). In some examples, the target frame rate may be based on a usage model that may have target frame rates that maintain an acceptable user experience when viewing rendered frames (e.g., on display 180). For example, a frame rate of at least 30 fps may be acceptable in some usage models, while in other usage models a higher frame rate of at least 60 fps may be acceptable. If the first average fps is greater than the target fps, the process moves to block 535. Otherwise, the process moves to decision block 540.

Moving from decision block 530 to block 535 (Maintain Current Performance State), rate manager 105 may include logic and/or features configured to maintain the current performance state for graphics subsystem 120 (e.g., via adjust feature 219). In some examples, no action may be needed because a determination was made that the first average frame rate was not higher than the target frame rate. For these examples, graphics subsystem 120 may be attempting to meet the target frame and raising its performance state may not be warranted at this time in the process.

Moving from decision block 530 to decision block 540 (Graphics Subsystem Performance State>Pn?), rate manager 105 may include logic and/or features configured to determine (e.g., via adjust feature 219) whether the current performance state associated with graphics subsystem 120 is greater than the lowest active performance state of Pn. In some examples, action may be needed to lower the performance state associated with graphics subsystem 120 because a determination was made that the first average frame rate was higher than the target frame rate. For these examples, unnecessary power may be consumed due to graphics subsystem 120 generating a higher frame rate than what is needed. If the current performance state associated with graphics subsystem 120 is at Pn, the process moves to block 545. Otherwise, the process moves to block 550.

Moving from decision block 540 to block 545 (Reduce Graphics Subsystem Performance State), rate manager 105 may include logic and/or features configured to cause (e.g., via adjust feature 219) the performance state associated with graphics subsystem 120 to be reduced. In some examples, the performance state associated with the active graphics subsystem may be reduced (e.g., from P0 to P1 or P1 to Pn) in order to lower a subsequent average frame rate.

Moving from decision block 540 to block 550 (Reduce Central Processing Performance state), rate manager 105 may include logic and/or features configured to cause (e.g., via adjust feature 219) the performance state associated with central processing (e.g., central processing unit 140) to be reduced (e.g., from P0 to P1, or P1 to Pn). In some examples, reducing the performance state associated with central processing unit 140 may be the only available option if the performance state associated with active graphics subsystem is already in Pn.

As shown in FIG. 5B, the process continues in a sustained mode "S" of operation. In some examples, as shown in FIG. 5A, the process may enter the sustained mode of operation following a determination that the average render time was greater than the target render time (see decision block 570) and also following possible performance state adjustments based on a comparison of the average frame rate to a target frame rate (see decision blocks 530 and 540). Thus, moving from circle S to block 555 (Gather Render Times), rate manager 105 may gather a second set of separate render times for one or more additional frames rendered by graphics subsystem 120.

Proceeding from block 555 to decision block 560 (Time Interval Expired?), rate manager 105 may determine whether a second time limit or time interval has been reached in order to still account for or filter out render time anomalies. If the second time interval has expired, the process moves to block 565. Otherwise, the process moves back to block 555 for additional gathering of render times.

Moving from decision block 560 to block 565 (Determine Ave. Render Time), rate manager 105 may determine a second average render time for the second separate render times gathered over the second time interval. In some examples, the above-mentioned example filter code may be used to calculate the second average render time.

Proceeding from block 565 to decision block 570 (Ave. Render Time<Target?), rate manager 105 may compare the second average render time to a target render time. If the second average render time is not less than the target render time, then graphics subsystem 120 is deemed to still be in a sustained mode and the process moves to block 575. Otherwise, graphics subsystem 120 is deemed to now be in a burst mode and the process moves back to block 505 of FIG. 5A.

Proceeding from block 575 to decision block 580 (Ave. fps>Target?), rate manager 105 may compare the second average frame rate to a target frame rate. In some examples, the second time interval may allow graphics subsystem 120 enough time to reach a steady state for rendering frames for display. Thus unlike decision block 530, if the second average frame rate is less than the target frame rate, subsequent efforts may occur to potentially raise the frame rate. So, if the second average frame rate is not less than the target frame rate, the process moves to block 585. Otherwise, the process moves to decision block 590.

Proceeding from block 575 to decision block 580 (Ave. fps>Target?), rate manager 105 may compare the second average frame rate to a target frame rate. In some examples, the second time interval may allow graphics subsystem 120 enough time to reach a steady state for rendering frames for display. Thus unlike decision block 530, if the second average frame rate is less than the target frame rate, subsequent efforts may occur to potentially raise the frame rate. So, if the second average frame rate is less than the target frame rate, the process moves to block 585. Otherwise, the process moves to decision block 590.

Moving from decision block 580 to block 585 (Maintain Current Performance State), rate manager 105 may maintain the current performance state for graphics subsystem 120. In some examples, the second average frame rate meets or exceeds the target frame rate and the current performance state may be maintained.

Moving from decision block 580 to decision block 590 (Graphics Subsystem Performance State!=P0?), rate manager 105 may include logic and/or features configured to determine (e.g., via adjust feature 219) whether the performance state associated with graphics subsystem 120 is already at the highest or maximum performance state of P0. If the current performance state associated with graphics subsystem 120 is at the highest or maximum performance state of P0, the process moves back to block 585. Otherwise, the process moves to block 595.

Moving from decision block 590 to block 595 (Raise Graphics Subsystem Performance State), rate manager 105 may include logic and/or features configured to cause (e.g., via adjust feature 219) the performance state associated with graphics subsystem 120 to be raised. In some examples, the performance state associated with graphics subsystem 120 may be raised (e.g., from P0 to P1 or P1 to Pn) in order to raise a subsequent average frame rate. The process may then return to block 555 for a subsequent or third time interval.

Figure 6:
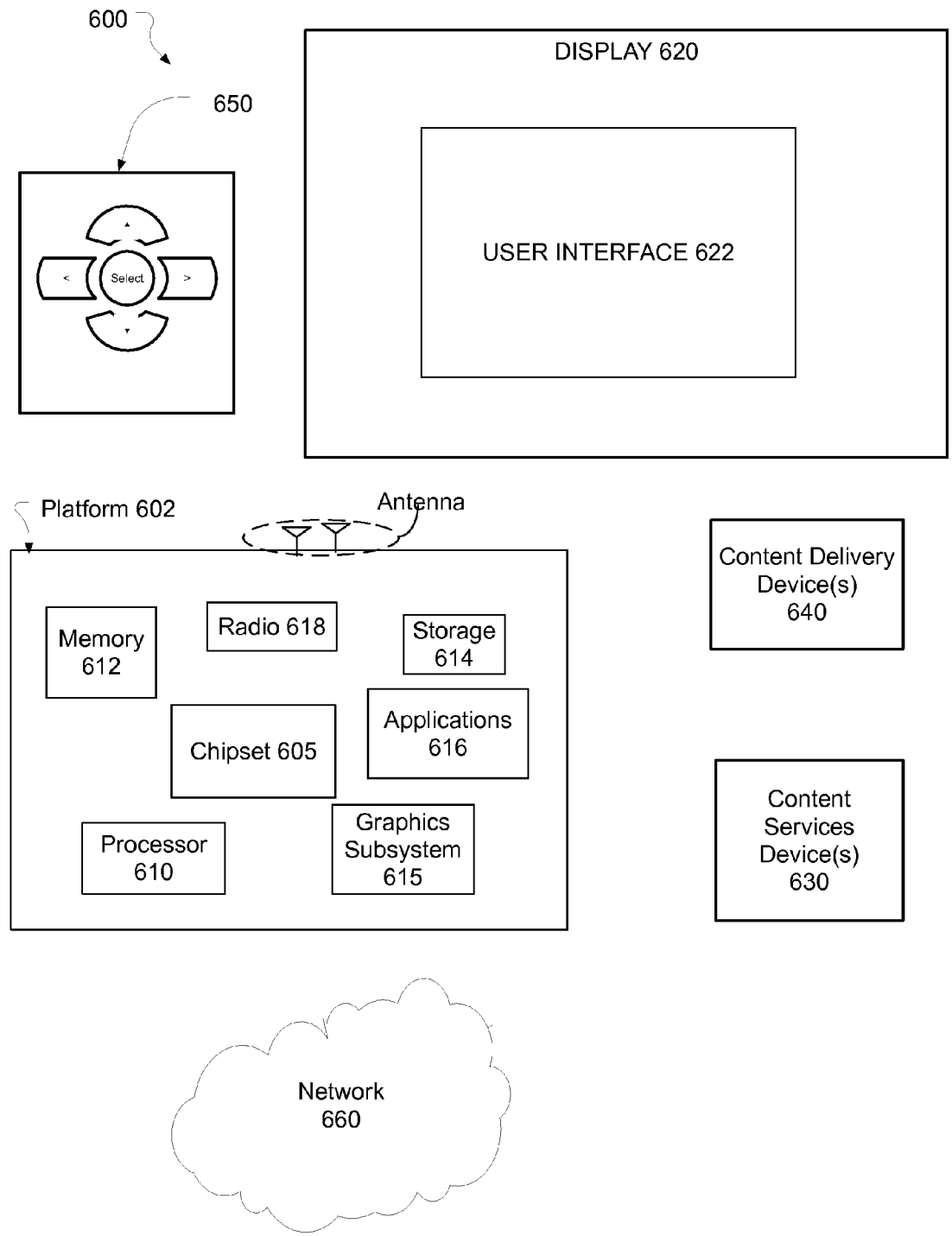
FIG. 6 illustrates an example system.

FIG. 6 illustrates an example system 600. In some examples, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

According to some examples, system 600 includes a platform 602 coupled to a display 620. Platform 602 may receive content from a content device such as content services device(s) 630 or content delivery device(s) 640 or other similar content sources. A navigation controller 650 including one or more navigation features may be used to interact with, for example, platform 602 and/or display 620. Each of these components is described in more detail below.

In some examples, platform 602 may include any combination of a chipset 605, processor 610, memory 612, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented as Complex Instruction Set Computer (CISC) or Reduced Instruction Set Computer (RISC) processors, x86 instruction set compatible processors, multi-core, or any other microprocessor or central processing unit (CPU). In some examples, processor 610 may comprise dual-core processor(s), dual-core mobile processor(s), and so forth.

Memory 612 may be implemented as a volatile memory device such as, but not limited to, a RAM, DRAM, or SRAM.

Storage 614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some examples, storage 614 may include technology to increase the storage performance enhanced protection for valuable digital media when multiple hard drives are included, for example.

Graphics subsystem 615 may perform processing of images such as still or video for display. Similar to the graphics subsystems described above for FIG. 1, graphics subsystem 615 may include a processor serving as a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. For some examples, graphics subsystem 615 could be integrated into processor 610 or chipset 605. Graphics subsystem 615 could also be a stand-alone card (e.g., a discrete graphics subsystem) communicatively coupled to chipset 605.

The graphics and/or video processing techniques described herein may be implemented in various hardware architectures. For example, graphics and/or video functionality may be integrated within a chipset. Alternatively, a discrete graphics and/or video processor may be used. As still another example, the graphics and/or video functions may be implemented by a general purpose processor, including a multi-core processor. In a further example, the functions may be implemented in a consumer electronics device.

Radio 618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In some examples, display 620 may comprise any television type monitor or display. Display 620 may include, for example, a computer display screen, touch screen display, video monitor, television-like device, and/or a television. Display 620 may be digital and/or analog. For some examples, display 620 may be a holographic display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display user interface 622 on display 620.

According to some examples, content services device(s) 630 may be hosted by any national, international and/or independent service and thus accessible to platform 602 via the Internet, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620.

In some examples, content services device(s) 630 may comprise a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, medical and gaming information, and so forth.

Content services device(s) 630 receives content such as cable television programming including media information, digital information, and/or other content. Examples of content providers may include any cable or satellite television or radio or Internet content providers. The provided examples are not meant to limit the scope of this disclosure.

In some examples, platform 602 may receive control signals from navigation controller 650 having one or more navigation features. The navigation features of controller 650 may be used to interact with user interface 622, for example. According to some examples, navigation controller 650 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 650 may be echoed on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In some examples, controller 650 may not be a separate component but integrated into platform 602 and/or display 620. Although this disclosure is not limited to the elements or in the context shown for controller 650.

According to some examples, drivers (not shown) may comprise technology to enable users to instantly turn on and off platform 602 like a television with the touch of a button after initial boot-up, when enabled. Program logic may allow platform 602 to stream content to media adaptors or other content services device(s) 630 or content delivery device(s) 640 when the platform is turned "off." In addition, chip set 605 may include hardware and/or software support for 5.1 surround sound audio and/or high definition 7.1 surround sound audio, for example. Drivers may include a graphics driver for integrated graphics platforms. For some examples, the graphics driver may comprise a peripheral component interconnect (PCI) Express graphics card.

In various examples, any one or more of the components shown in system 600 may be integrated or may be virtualized. For example, platform 602 and content services device(s) 630 may be integrated, or platform 602 and content delivery device(s) 640 may be integrated, or platform 602, content services device(s) 630, and content delivery device(s) 640 may be integrated, for example. In various examples, platform 602 and display 620 may be an integrated unit. Display 620 and content service device(s) 630 may be integrated, or display 620 and content delivery device(s) 640 may be integrated, for example. These examples are not meant to limit this disclosure.

In various examples, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The examples mentioned above, however, are not limited to the elements or in the context shown or described in FIG. 6.

Figure 7:
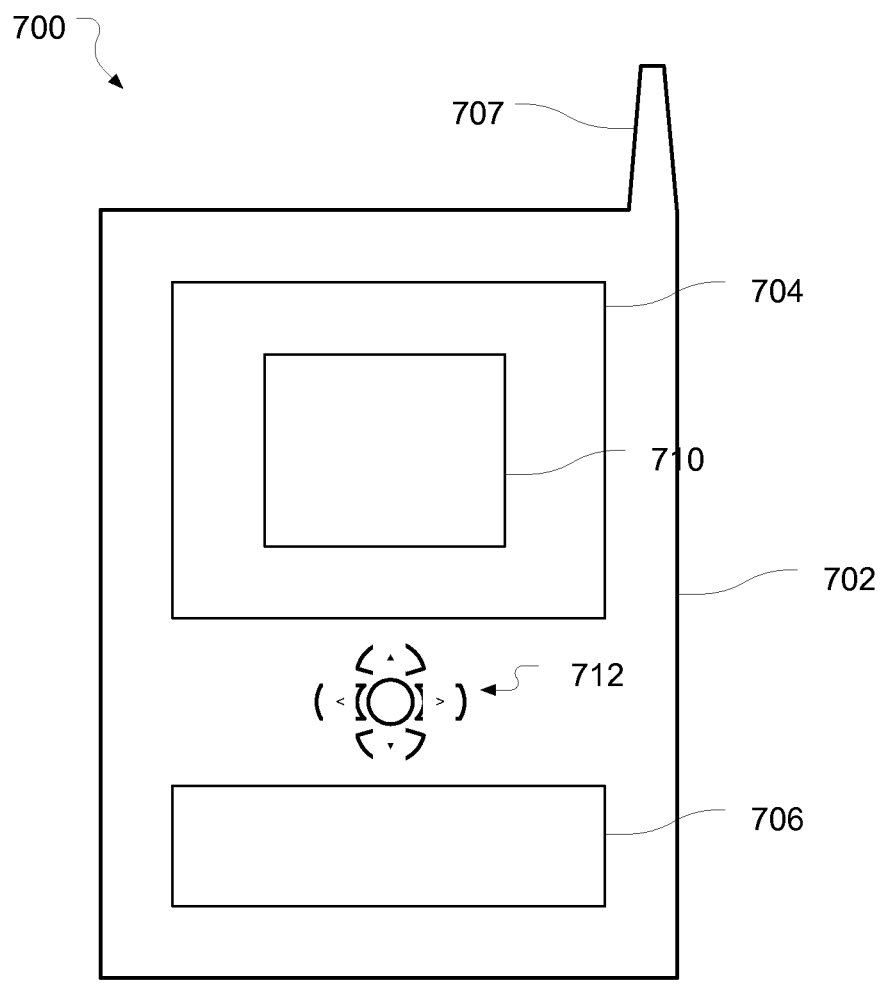
FIG. 7 illustrates an example device.

FIG. 7 illustrates an example device 700. As described above, system 600 may be embodied in varying physical styles or form factors. FIG. 7 illustrates examples of a small form factor device 700 in which system 600 may be embodied. In some examples, device 700 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. According to some examples, a mobile computing device may be implemented as a smart phone capable of executing computer applications, as well as voice communications and/or data communications. Although some examples may be described with a mobile computing device implemented as a smart phone by way of example, it may be appreciated that other examples may be implemented using other wireless mobile computing devices as well. The examples are not limited in this context.

As shown in FIG. 7, device 700 may include a housing 702, a display 704, an input/output (I/O) device 706, and an antenna 708. Device 700 also may include navigation features 712. Display 704 may include any suitable display unit for displaying information appropriate for a mobile computing device. I/O device 706 may include any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone. For some examples, a voice recognition device may digitize such information. Although the disclosure is not limited in this context.

Various examples may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture. An article of manufacture may include a storage medium to store logic. In some examples, the storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. According to some examples, an article of manufacture may store executable computer program instructions that, when executed by a computer, cause the computer to perform methods and/or operations in accordance with the described examples. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more non-transitory computer-readable media, with instructions stored thereon, which when executed by a processor, cause the processor to perform a graphics frame rate control method comprising:
   determining a first frame rate at which first graphics frames are provided by a graphics subsystem operating at a first graphics subsystem operating frequency;
   determining a first average render time associated with the first graphics frames from render times associated with separate render commands executed by a processor of the graphics subsystem over a first time interval;
   determining the graphics subsystem to be in a burst mode in response to the first average render time satisfying a render time threshold or in a sustained mode in response to the first average render time failing to satisfy the threshold; and
   controlling the graphics subsystem while in the burst mode, to lower the graphics subsystem operating frequency from the first graphics subsystem operating frequency to a non-zero second graphics subsystem operating frequency in response to the first frame rate exceeding a target frame rate, and to maintain the operating frequency in response to the first frame rate failing to exceed the target frame rate; and controlling the graphics subsystem while in the sustained mode, to raise the graphics subsystem operating frequency from the first graphics subsystem operating frequency in response to the first frame rate failing to exceed the target frame, and maintain the operating frequency in response to the first frame rate exceeding the target frame rate.

2. The media of claim 1, wherein the media further comprises instructions to cause the processor to perform the method further comprising:
comparing the first frame rate and the target frame rate; and
controlling the graphics subsystem to a lower power or performance state associated with the second graphics subsystem operating frequency.

3. The media of claim 1, wherein determining the first frame rate further comprises determining an average frame rate associated with the burst mode of the graphics subsystem over the first time interval.

4. The media of claim 1, wherein controlling the graphics subsystem to lower the graphics subsystem operating frequency further comprises:
lowering a power or performance state associated with the graphics subsystem in response to the first frame rate exceeding the target frame rate and the graphics subsystem being above a minimum performance state; and
determining a second frame rate at which second graphics frames are provided by the graphics subsystem operating at the second graphics subsystem operating frequency.

5. The media of claim 4, wherein
determining the first frame rate further comprises determining a first average frame rate over the first time interval; and
determining the second frame rate further comprises determining the second average frame rate over a second time interval that is approximately equal to the first time interval.

6. A mobile computing system, comprising:
a graphics subsystem operable at a first operating frequency to provide first graphics frames at a first frame rate; and
a multi-core central processor with logic to:
determine a first average render time associated with the first graphics frames from render times associated with separate render commands executed by a processor of the graphics subsystem over a first time interval;
determine the graphics subsystem to be in a burst mode in response to the first average render time satisfying a render time threshold or in a sustained mode in response to the first average render time failing to satisfy the threshold;
control the graphics subsystem while in the burst mode to lower an operating frequency of the graphics subsystem from the first graphics subsystem operating frequency to a non-zero second operating frequency in response to the first frame rate exceeding a target frame rate, and maintain the operating frequency in response to the first frame rate failing to exceed the target frame rate; and
control the graphics subsystem while in the sustained mode, to raise the graphics subsystem operating frequency from the first graphics subsystem operating frequency in response to the first frame rate failing to exceed the target frame, and maintain the operating frequency in response to the first frame rate exceeding the target frame rate.

7. The system of claim 6, wherein:
the central processor includes logic to control the graphics subsystem to operate at the second operating frequency by lowering a power or performance state associated with the graphics subsystem in response to the first frame rate exceeding the target frame rate; and
the graphics subsystem includes logic operable at the second operating frequency to render second frames at a second frame rate, lower than the first frame rate.

8. The system of claim 6, wherein the central processor includes logic to:
determine an average frame rate associated with the burst mode over the first time interval;
compare the first average frame rate to a target frame rate;
control the graphics subsystem to operate at the second operating frequency by lowering a power or performance state associated with the graphics subsystem in response to the first frame rate exceeding the target frame rate; and
determine a second average frame rate at which second graphics frames were provided by the graphics subsystem operating at the second graphics subsystem operating frequency over a second predetermined time interval that is approximately equal to the first predetermined time interval.

9. The system of claim 6, wherein:
the graphics subsystem comprises a graphics processing unit (GPU), and the central processor is to control the GPU to the second operating frequency by lowering a power or performance state associated with the GPU in response to the first frame rate exceeding the target frame rate; and
the system further includes a display coupled to the graphics subsystem to output a visual representation of the first frames.

10. The system of claim 9, further including a wireless high-definition multimedia interface communicatively coupled to the graphic subsystem, the wireless interface to convey the rendered first frames at a first frame rate.

11. A system, comprising:
a graphics driver; and
a multi-core processor including:
a first graphics subsystem operable at a first operating frequency to provide first frames at a first frame rate; and
a central processor core to execute the graphics driver, wherein:
the driver comprises logic to cause the processor core to determine a first frame rate at which first graphics frames are provided by a graphics subsystem operating at a first graphics subsystem operating frequency;
the driver comprises logic to cause the processor core to determine the graphics subsystem to be in a burst mode in response to a first average render time satisfying a render time threshold or in a sustained mode in response to the first average render time failing to satisfy the threshold, wherein the first average render time is determined from render times associated with separate render commands executed by a processor of the graphics subsystem over a first time interval;
the graphics driver further includes logic to cause the central processor core to send control commands to the graphics subsystem while in the burst mode to lower an operating frequency of the graphics subsystem from the first graphics subsystem operating frequency to a non-zero second graphics subsystem operating frequency in response to the first frame rate exceeding a target frame rate while the graphics subsystem is in the first operational mode, and maintain the operating frequency in response to the first frame rate failing to exceed the target frame rate; and the graphics driver further includes logic to cause the central processor core to send control commands to the graphics subsystem while in the sustained mode, to raise the graphics subsystem operating frequency from the first graphics subsystem operating frequency in response to the first frame rate failing to exceed the target frame, and maintain the operating frequency in response to the first frame rate exceeding the target frame rate.

12. The system of claim 11, wherein the driver includes logic to cause the processor to lower a power or performance state associated with the graphics subsystem in response to the first frame rate exceeding the target frame rate and the graphics subsystem being above a minimum performance state, and to determine a second frame rate at which second graphics frames are rendered by the graphics subsystem operating at the second graphics subsystem operating frequency.

13. The system of claim 12, wherein the driver includes logic to cause the processor to determine a first average frame rate over the first time interval, and determining a second average frame rate over a second time interval that is approximately equal to the first predetermined time interval.

* * * * *